US008321430B2

(12) United States Patent
Zvi et al.

(10) Patent No.: US 8,321,430 B2
(45) Date of Patent: Nov. 27, 2012

(54) RESOURCE EFFICIENT HANDLING CHANGE NOTIFICATIONS IN GRAPH STRUCTURES

(75) Inventors: Elisha Ben Zvi, Hod-Hasharon (IL); Robert Krien, Moshav Beit Sheakim (IL); Zohar Sheinberg, Tel-Aviv (IL); Vitaly Vainer, Kfar-Saba (IL)

(73) Assignee: SAP Portals Israel Ltd., Raanana (IL)

(*) Notice: Subject to any disclaimer, the term of this patent is extended or adjusted under 35 U.S.C. 154(b) by 629 days.

(21) Appl. No.: 12/434,694

(22) Filed: May 4, 2009

(65) Prior Publication Data
US 2010/0281071 A1 Nov. 4, 2010

(51) Int. Cl.
G06F 7/00 (2006.01)
G06F 17/30 (2006.01)

(52) U.S. Cl. ........................................ 707/754; 707/798

(58) Field of Classification Search .......... 707/600–831; 706/45, 56; 709/217, 219, 226, 227, 229
See application file for complete search history.

(56) References Cited

U.S. PATENT DOCUMENTS

| 6,154,736 | A | * | 11/2000 | Chickering et al. | 706/59 |
| 6,836,821 | B2 | * | 12/2004 | Moore et al. | 711/114 |
| 7,310,677 | B1 | * | 12/2007 | Cohen et al. | 709/229 |
| 2005/0125803 | A1 | * | 6/2005 | Miller et al. | 719/310 |

OTHER PUBLICATIONS

Torsten Robschink et al., Efficient Path Conditions in Dependence Graphs, May 19-25, 2002, IEEE, 478-488.*

* cited by examiner

Primary Examiner — Jean B Fleurantin

(57) ABSTRACT

A method and apparatus for handling a data structure in a computerized system, the data structure comprising a first object having content and a second object having content, and interdependencies between the first object and the second object, the method comprising: receiving a description of the data structure; creating a graph structure indicating the interdependencies between the objects, the graph structure comprising at least a first vertex and a second vertex, the first vertex and the second vertex connected by an edge; and associating the first vertex with content of the first object and the second vertex with content of the second object, wherein the first vertex and the second vertex do not contain the content of the first object or the second object.

In some embodiments, an application executed by computing platforms in a cluster comprising symmetrical nodes, statically registers relevant filters with every node in the cluster, and registers to the filter upon loading. When an event occurs in a node, only if the event passes any of the filters it is transferred to the other nodes in the cluster. In each of the other nodes, components are invalidated by traversing the dependency graph.

12 Claims, 6 Drawing Sheets

RESOURCE EFFICIENT HANDLING CHANGE NOTIFICATIONS IN GRAPH STRUCTURES

TECHNICAL FIELD

The present disclosure relates to graph structures in general, and to a method and apparatus for memory and resource efficient change notification in graph-like structured nodes and applications.

BACKGROUND

A graph is an abstract data type, in which vertices typically represent objects or entities, and edges represent relationships or connections between the objects or entities. Graph structures are used in multiple computerized applications and environments.

A recognized issue in environments having a graph representation relates to change notification, i.e., how to propagate changes made to one node within the graph, so that integrity and consistency of the graph and its data is preserved, while avoiding resource waste, including memory, time, communication volume, processing power and others.

One common usage of graph representation relates to a computerized environment comprising multiple computers (also referred to as machines or nodes) which may be arranged in clusters. One or more of the nodes executes one or more applications which use multiple components, such as web pages, units, executables, static libraries, dynamic libraries, or the like. For example, an enterprise portal may be installed on a cluster of nodes comprising a multiplicity of computers. Each of the enterprise-portal components, which reside on the various computers in the cluster, may depend on multiple other components and load them into memory during execution, into for example a cache memory used for efficient access to the components. When using a graph representation, the loaded or executed components are the vertices, and dependency between two components is represented as an edge.

When any of the components changes, for example by an application executed on another node in the cluster, the component as well as other components dependent on it may have to be updated as well, depending on the dependency, and the type of change. Since components may also be removed from the cache memory, a situation may occur in which a component does not exist in memory, but still has to be updated so that other components dependent on it can be updated. As an enterprise portal may contain tens, hundreds or thousands of components, the decisions of whether and which components should be held in memory, and which change notification policy is used, have heavy implications on the resource consumption and the performance of the computing platform and the executed applications.

One common solution is keeping all components required for an application in the memory device of a computing platform at all times, and receiving specific notification for each updated component. This solution provides for time-efficient updating, but wastes a lot of memory by keeping components which may be unnecessary in the memory.

Another solution involves keeping in memory only the necessary components, and evacuating other components that are used, for example, during loading of other components but are not required at a later time, and receiving notification for components that have been changed directly. In such case, the computing platform has to determine which other components should be updated. This solution requires higher management effort on the side of the application, and is thus wasteful in time and processing power resources.

There is thus a need in the art for a method and apparatus for maintaining and propagating change notifications within computerized graph-structured systems, while making efficient usage of memory, time, CPU and other resources.

SUMMARY

A method and apparatus for efficiently handling dependency-rich structures. The dependency information is handled in a graph structure wherein the vertices represent the objects and edges connecting vertices represent dependency between the respective objects. The graph structure is separated from the actual contents of the objects, so that each object can be evacuated from memory without disabling access to objects dependent upon it. Changes are propagated to the objects in accordance with the graph dependencies. In some embodiments, an application executed by computing platforms in a cluster comprising symmetrical nodes, statically registers relevant filters with every node in the cluster, and register to the filter upon loading. When an event occurs in a node, only if the event passes any of the filters it is transferred to the other nodes in the cluster. In each of the other nodes, components are invalidated by traversing the dependency graph.

One aspect of the disclosure relates to a method for handling a data structure in a computerized system, the data structure comprising first object having content and a second object having content, and interdependencies between the first object and the second object, the method comprising: receiving a description of the data structure; creating a graph structure indicating the interdependencies between the objects, the graph structure comprising at least a first vertex and a second vertex, the first vertex and the second vertex connected by an edge; and associating the first vertex with content of the first object and the second vertex with content of the second object, wherein the first vertex and the second vertex do not contain the content of the first object or the second object. Within the method, the first vertex represents the first object, the second vertex represents the second object, and the edge represents dependency between the first object and the second object. Within the method, the first edge is optionally a directed edge. The method can further comprise the steps of: receiving a notification about a change in the contents of the object associated with the first vertex; indicating in association with the first vertex that content of the first object or the second object should be reloaded; indicating in association with the second vertex that content of another of the first object or the second object should be reloaded. Within the method, the edge is optionally associated with an attribute, such that the second object is dependent on the first object only if the change is associated with the attribute. The method can further comprise a step of notifying one or more applications associated with the data structure about the change. Within the method, the computerized system optionally comprises two nodes adapted to execute an application, and the graph structure resides in a memory unit of each of the two nodes when one of the two nodes executes the application, the first object and the second object associated with the first vertex and the second vertex of the graph structure being components required for the application. Within the method, the graph structures reside in the memory unit of each two nodes are optionally identical. The method can further comprise: constructing a dependency graph and one or more event filters for the application; registering each event filter with the application on each of the two nodes;

registering the application to one or more of the event filters when the application is executed on a first node; receiving from the application a change event for one or more components; validating whether the change event passes the filter; consequent to said validation, sending the change event and the filter to the second node; verifying whether the component is being used by the second node; consequent to said verification, indicating in association with the second vertex that an associated component should be reloaded; and consequent to said verification, indicating in association with the first vertex that the first component should be reloaded. The method can further comprise a step of notifying the application executed on the second node about the change.

Another aspect of the disclosure relates to an apparatus for handling a data structure in a computerized system comprising a first node and a second node and executing two or more applications, the data structure comprising two objects having content, and interdependencies between the two objects, the apparatus comprising: one or more preparatory components activated when one of the applications in the environment changes; one or more source machine components activated by the first node on which a particular component of one of the two applications changes; one or more source machine components activated by the first node on which a particular component, part, or data associated with one of the two applications changes; and one or more other nodes components activated on the second node after a change occurred on one of the nodes. Within the apparatus, the preparatory components optionally comprise: a dependency graph determination component; an event filter determination component; and a static event filter registration component. The dependency graph determination component optionally creates a graph structure indicating the interdependencies between the two objects, the graph structure comprising at least a first vertex and a second vertex, the first vertex and the second vertex connected by an edge. Within the apparatus, the source machine components optionally comprise: an event filter validation component; and an event propagation component. Within the apparatus, the other nodes component optionally comprises: an event subscription component; a graph traversing component; an event validating component; and a cache handling component.

Yet another aspect of the disclosure relates to a computer readable storage medium containing a set of instructions for a general purpose computer, the set of instructions comprising: receiving a description of a data structure, the data structure comprising a first object having content and a second object having content, and interdependencies between the first object and the second object; creating a graph structure indicating the interdependencies between the first object and the second object, the graph structure comprising a first vertex and a second vertex, the first vertex and the second vertex connected by an edge; and associating the first vertex with content of the first object and the second vertex with content of the second object, wherein the first vertex and the second vertex do not contain the content of the first object or the second object.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
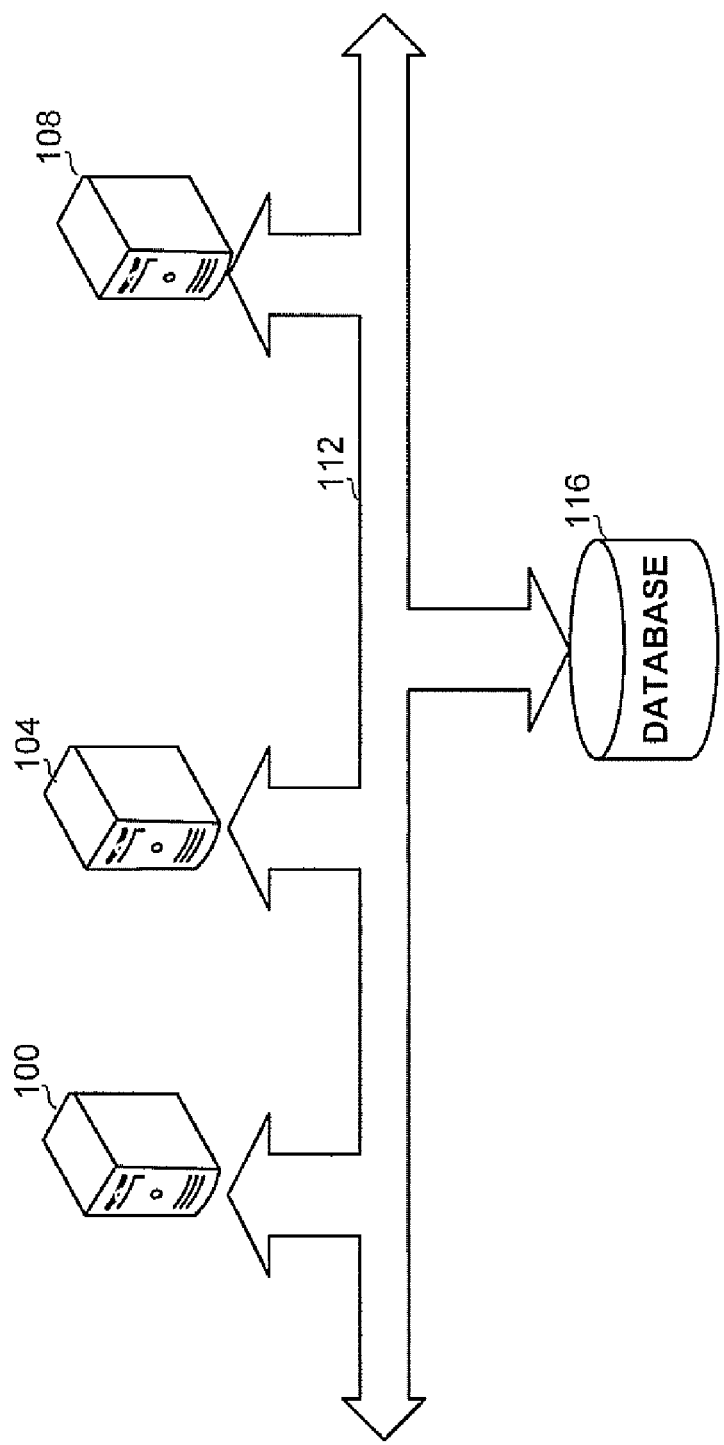
FIG. 1 shows a schematic illustration of a typical environment in which the disclosed method and apparatus are used.

The disclosure relates to computerized environments employing a multiplicity of objects with inter-dependencies, in which changes to objects may have to be propagated to objects depending upon them. The disclosure also relates to such environments in which the objects are large, i.e. their content consumes significantly more storage or memory space than the inter-object dependency information.

In one exemplary environment, one or more applications are executed by one or more computing platforms. Typically the number of applications is between a few and a few dozens. Each application constructs one or more application objects, typically between a few and a few thousands. Exemplary application objects include but are not limited to pages, roles, iViews, WorkCenters, link collections, folders, systems, or the like.

In some embodiments an iView is a content unit or object which represents the smallest node, i.e., which contains no further objects, in a navigable hierarchy which can be executed from within a web page. An iVIew may represent an application or a part of business scenario. A WorkCenter is a container object for other navigable hierarchies comprising iViews, pages, folders, and other content data. In some embodiments, a WorkCenter represents a business scenario.

Each application object may depend, directly or indirectly on a multiplicity of other objects, such as but not limited to objects of the same type, including pages, roles, iViews, WorkCenters, link collections, folders, systems, or the like. In accordance with the disclosure, in order to enable memory efficiency, the content of the objects is separated from the dependency structure. Thus, a graph is constructed, in which each vertex represents an object, and each edge represents dependency between two objects. The dependency graph resides in the memory of a relevant computer platform. The dependency graph in the memory comprises a particular object and its dependent sub-graph at all times in which one or more applications listening to changes in the object are loaded to memory, on any of the machines. An object and its dependent sub-graph are removed from the dependency graph only when no application executed on any of the machines is registered to changes in the object. The addition and removal of objects and sub-graphs thereof are performed on all nodes, so that the dependency graphs are always identical on all machines in the cluster.

However, even if a particular graph object is comprised in the dependency graph, the contents of the object itself may be present in the memory or evacuated from the memory of any of the machines in the cluster, in accordance with various considerations, such as caching considerations. The vertices of the dependency graph do not contain the information associated with the respective objects, so that the graph takes up significantly less memory space than the whole object structure with their content.

For every application executed by a computing platform, the dependency graph for all objects associated with the application is constructed and kept in memory as long as the application is executed.

When a change in an object occurs, for example due to the object being altered by another entity, such as another application using the same entity, it is first determined whether the object is present in the memory of the computing platform. If the object is present in the memory, then it is invalidated, for example by indicating the corresponding object in the dependency graph as "invalid", "changed", "should be reloaded" or the like, whether it was present in memory or not. This indicates that the content of the corresponding object, or an object it depends upon has changed, so that the object is not valid and should be reloaded. The dependency graph is then checked to determine whether there are other objects that depend directly or indirectly on the altered object. If there is such a dependent object, the process is repeated for each dependent object, and the corresponding objects in the dependency graph are also indicated as "should be reloaded", "changed", "invalid", or the like. Later, when such an object is required, the indication causes the system to unload it if it is loaded, and then reload the updated version.

Optionally, each dependency has one or more attributes, so that only if the change in the object that was indicated as changed relates to one of the attributes, the dependent object is invalidated as well.

For example, if object B depends on object A, and the dependency is associated with the "name" attribute, then if another attribute of object A was changed, object B and all objects dependent on B will not be invalidated.

In some embodiments, an environment comprises one or more symmetric nodes in a cluster, i.e., computing platforms that have the same installed applications and provide users with the same functionality, so that changes made to a component in one node may be have to be notified to all other nodes. In such environments, en event that changes an element can be checked on the node on which it occurred, and only if required then the event should be passed to the other nodes so that the corresponding objects can be updated if necessary. Validation on the "origin" node can save significant communication and processing time, by avoiding the transfer and validation of irrelevant events on multiple nodes.

This advantage can be achieved by the applications (which are assumed to be the same for all nodes) registering statically on each node filters indicating events that are important for them. An event filter is a filter indicating a change in one or more attributes of an event, for example "a 'name' change event for an object of type 'page'. Static registration means that the filters are registered with the nodes at all times. Then when the application loads on any node, it registers to events according to the available static filters. When the application is executed, each event is verified against the filters, and only if proven valid it is transferred to the other nodes, together with all validated filters.

On the other nodes, it is verified whether the component the event refers to is currently in use by any application. If it is, then the component is invalidated or otherwise marked as changed, and so are all other components dependent on it, in accordance with the filter passed with the event. Then, if any of the currently executed applications is subscribed for the specific event or event type, the application is notified about the change.

The separation of the dependency structure from the contents, wherein only the dependency structure is guaranteed to be kept in memory at all times, enables higher granularity of caching the objects, wherein not all objects associated with all executed applications have to be present or evacuated from the cache at the same time.

It will be appreciated that separating the dependency structure of a graph from the actual contents of its vertices provides for more efficient handling of the graph, as well as more flexible caching, since the contents of each individual node can be present or absent from the graph without disconnecting other vertices.

The static event filters provide for efficient handling of events, by verifying whether events should be propagated in the node on which they occur, thus eliminating unneeded propagation and processing of events by other nodes.

Referring now to FIG. 1, showing a typical computing environment in which the disclosed method and apparatus are used.

The environment typically comprises a cluster of nodes, wherein each node is a computing platform, such as computing platforms 100, 104 or 108. Each computing platform comprises a central processing unit (CPU), memory, communication devices, and optionally a storage device.

Computing platforms 100, 104 or 108 communicate through communication channel 112, such as the Internet, intranet, local area network (LAN), wide area network (WAN) or any other communication channel.

The environment also comprises a storage device 116, accessible by the computing platform. Storage device 116 may be a mass storage device, for example an optical storage device such as a CD, a DVD, or a laser disk; a magnetic storage device such as a tape or a hard disk; a semiconductor storage device such as Flash device, memory stick, or the like. It will be appreciated that storage device 116 is optionally associated with any of computing platforms 100, 104, or 108.

Each computing platform executes one or more applications. Applications executed by different computing platforms may be independent or related. Related applications executed by different computing platforms may share information stored on storage device 116. When related applications share information, the information may be stored locally in memory devices of the computing platform. When such information is changed by one of the computing platforms, it may be required to notify or update the other computing platforms using the information. The change may be updated in storage device 116, for all computing platforms to access. However, since the applications may involve any number of information pieces, such update should be performed in an efficient manner, so as to avoid as much as possible situations in which multiple computing platforms access storage device 116, thus wasting time and communication volume.

In some embodiments, nodes 100, 104 and 108 are symmetrical with each other, i.e. have the same installed applications and provide users with the same functionality, so that changes made to a component in one node may be have to be notified to all other nodes.

Figure 2:
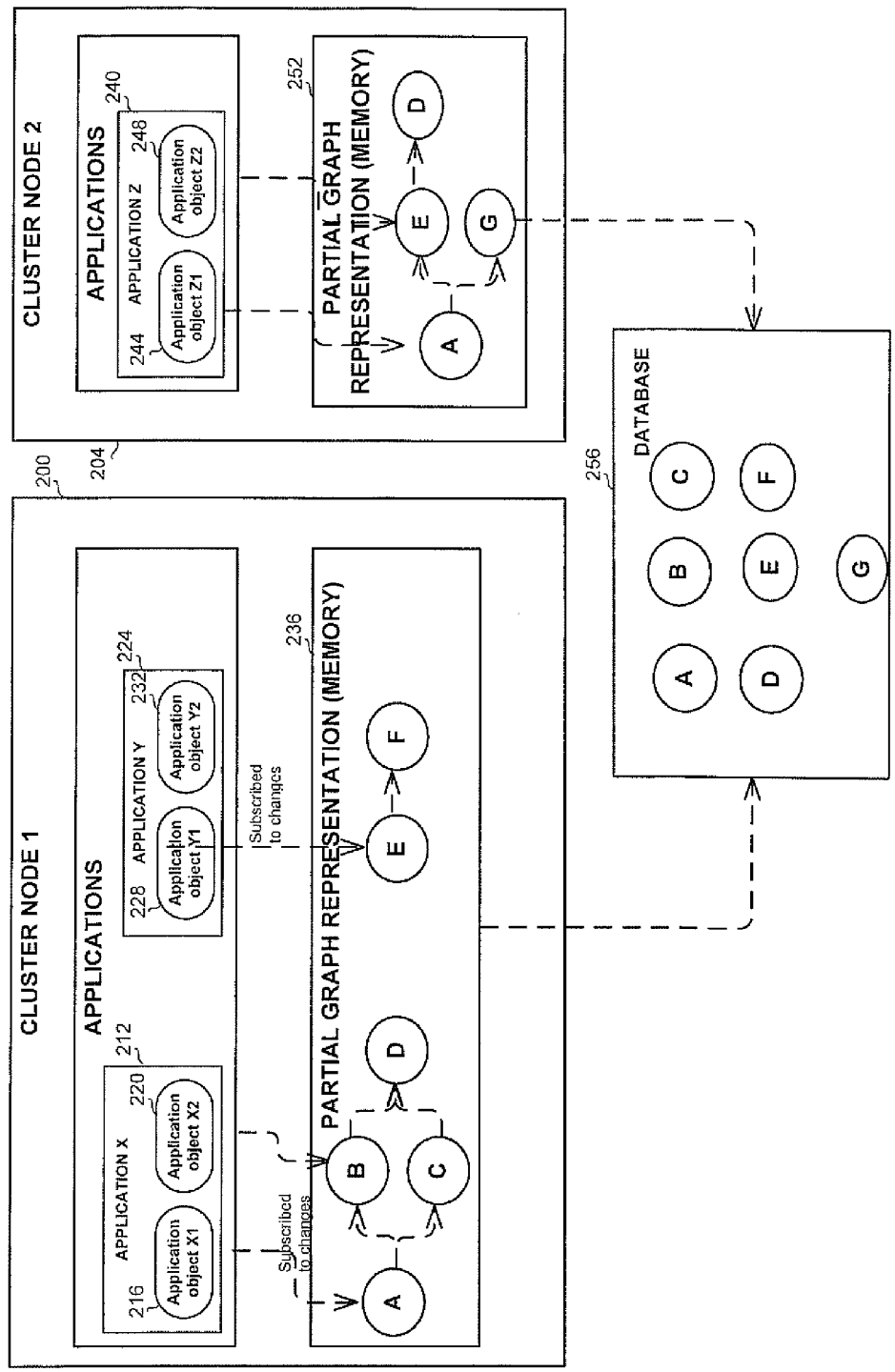
FIG. 2 is a schematic illustration of the objects and memory structure involved in executing an application.

Referring now to FIG. 2, showing a schematic illustration of the objects and memory structure involved in executing an application, when the disclosed method and apparatus are not used. FIG. 2 shows two nodes, being cluster node 1 (200) and cluster node 2 (204). Each cluster mode executes applications, such as application X (212) and application Y (224) executed by cluster node 1 (200), or application Z executed by cluster node 2 (204). Each application creates one or more application objects, such as application object X1 (216) or application object X2 (220) created by application X (212), application object Y1 (228) or application object Y2 (232) created by application Y (224), and application object Z1 (244) or application object Z2 (248) created by application Z (240).

Each cluster node maintains in its memory the graph representation relevant for the applications executed at that time, such as graph representation 236 of cluster node 1 (200), or graph representation 252 of cluster node 2 (204). Each partial graph representation keeps the objects with their contents, such as objects A, B, C and for application X (212), objects E and F for application Y (224), and objects A, E, G and D for application Z (240). The partial graph representation keeps also the dependency relationships between the objects. All objects in the partial graph representations are constructed upon the corresponding objects in database 256. When any of the objects is changed by an application, the corresponding object is updated in database 256, and reloaded by the other applications. This structure incurs heavy requirements on the memory devices of the computing platforms, and is therefore subject to intensive caching. Since caching mechanisms are usually not aware of dependencies between objects, many objects are likely to be evacuated and reloaded even if this is not required. Database 256 comprises the objects, but not relationships therebetween, since such relationships may vary according to the particular applications using the objects in every node. The relationships are indicated in the dependency graphs of the nodes, which are all identical.

Figure 3:
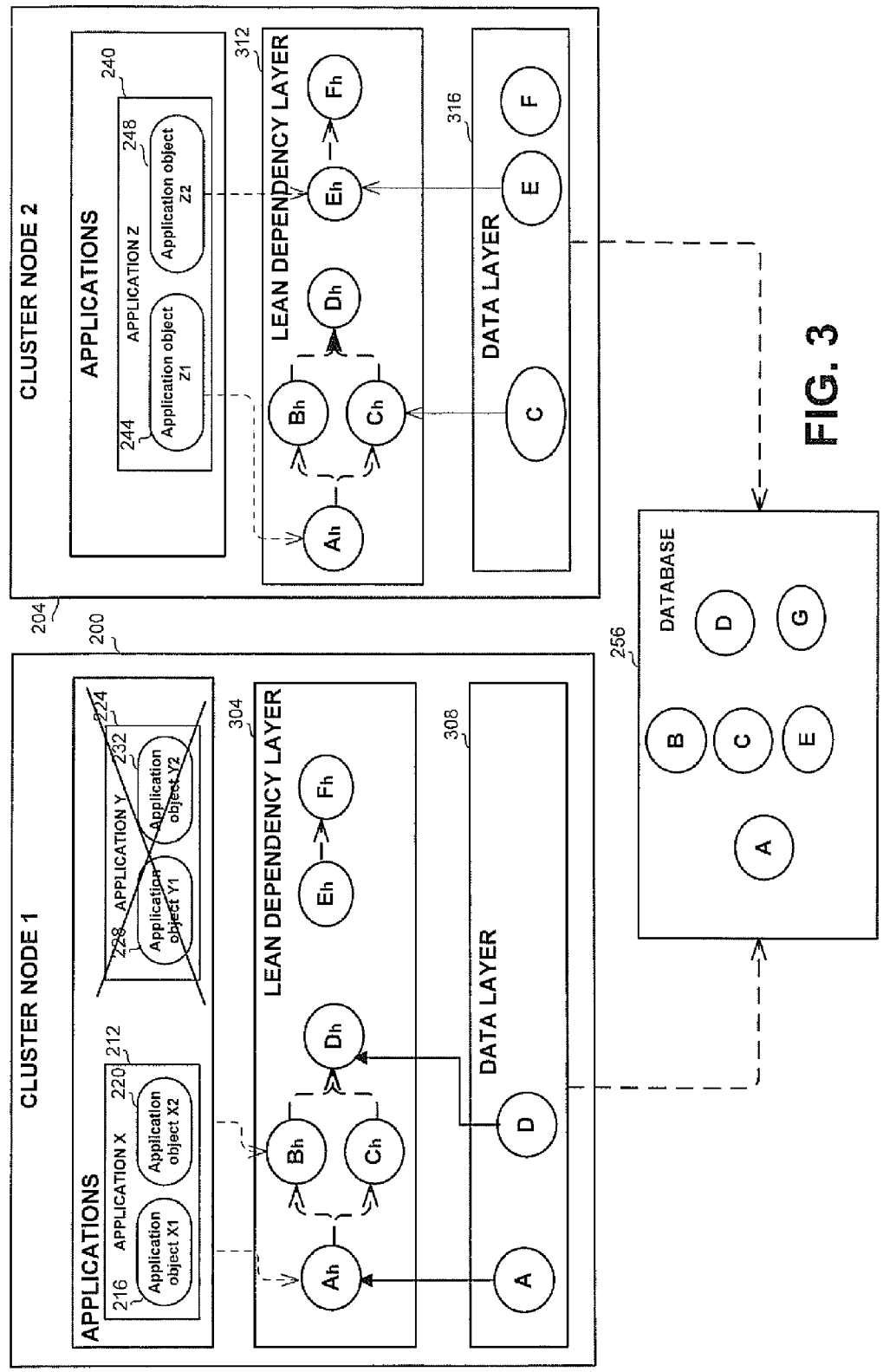
FIG. 3 is a schematic illustration of the objects and memory structure involved in executing an application, in accordance with the disclosure.

Referring now to FIG. 3, showing a schematic illustration of the objects and memory structure when executing an application, when the method and apparatus of the disclosure are implemented.

As in FIG. 2 above, cluster node 1 (200) executes application X (212) which creates application object X1 (216) and application object X2 (220). However, unlike the situation in FIG. 2, cluster node 1 (200) does not execute application Y (224) which creates application object Y1 (228) and application object Y2 (232). Cluster node 2 (204) executes application Z (240) which creates application object Z1 (244) and application object Z2 (248).

In accordance with the disclosed method and apparatus, each cluster mode comprises a lean dependency layer, such as layer 304 of cluster mode I (200) or layer 312 of cluster mode 2 (204). At any given time, the dependency layer comprises a directed dependency graph representing the objects associated with the applications executed cluster-wide at the given time.

However, the vertices of the dependency graph, which represent objects, do not contain the actual content of the objects. Each edge within the graph represents dependency of its source vertex on its destination vertex. For example an edge going from object A to object B indicates that if object B changes, then object A should be invalidated, such that if object A is to be used, it should first be fetched from the database. Thus, the graph merely denotes the dependency relationships within the components used by the applications, and not their contents. Thus, lean dependency layers 304 and 312 require substantially less memory space than graph representations 236 and 252, respectively, detailed in association with FIG. 2 above.

All dependency graphs in all nodes are identical. Thus, although cluster node 1 (200) does not currently execute application Y (224) which requires objects $E_h$ and $F_h$, these objects are comprised in the dependency graph of cluster node 1 (200) since they are required by application Z (240) executed by cluster node 2 (204). An object is removed from the graph only if none of the applications executed on all machines references this object.

The graph vertices are designated as $A_h, B_h, \ldots F_h$ since they are different from objects A, B . . . H of FIG. 2. Objects $A_h, B_h, \ldots F_h$ comprise merely the hierarchical structure, i.e. the dependency information of the corresponding objects, while their actual contents may reside in data layer 308 or 316 detailed below.

Optionally, one or more edges of the graph, for example an edge indicating that object A depends on object B, is associated with one or more attributes or filters, such as "name". The attribute indicates that only if the relevant attribute of the object B changes, then object A should be invalidated. If object A is not invalidated, none of the objects dependent on object A should be invalidated as well, thus saving processing time, processing power and communication resources.

Each cluster node comprises also a data layer, which may be implemented as a cache memory. The data layer comprises the actual contents of one or more objects associated with the graph, such as objects A, B, C or the like. The data layers, such as data layer 308 of cluster node 1 (200) and data layer 316 of cluster node 2 (204) are in communication with database 256, which comprises the updated objects. When required, data layers 308 and 316 obtain the updated versions of the objects from database 256.

Figure 3A:
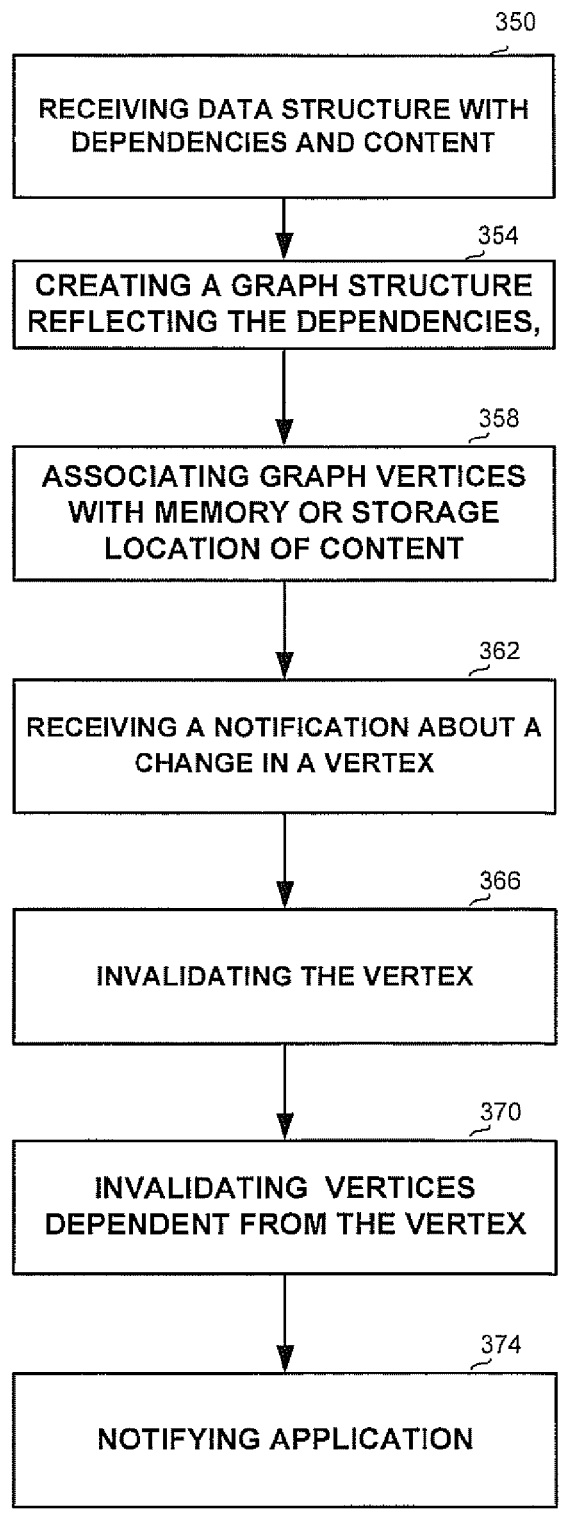
FIG. 3A is a flowchart of the main steps in a method for efficiently handling a data structure comprising objects with interdependencies.

Referring now to FIG. 3A, showing a flowchart of the main steps in a method for efficiently handling a data structure comprising object with interdependencies.

On step 350, a description of the data structure is received from a storage device or a communication channel. The data structure comprises dependencies between objects thereof, and content associated with one or more of the objects. An object dependent on another object may require the other object in order to be created or in order to provide functionality. In some embodiments, the volume or amount of the content is substantially larger than the volume required for expressing the inter-dependencies between the objects.

On step 354 a graph structure is created, which reflects the dependencies between the objects. The graph comprises vertices wherein each vertex is associated with an object, and directed edges in which an edge connecting object A and object B indicates that object B depends upon object A.

On step 358 any one or more of the graph vertices are associated with the actual contents of the object associated with the vertex. The association can be in the form of a pointer, a storage location or the like. At this stage the graph is ready for operations and can be handled, cached and updated in an efficient manner.

On step 362 a notification is received indicating a change in a graph vertex. On step 366 the vertex is accessed, and indicated in the dependency graph as invalid. Then, on step 370, using any graph traversal method, including but not limited to breadth-first-search (BFS), depth-first-search (DFS) or the like, all other vertices which are dependent directly or indirectly on the changed vertex are invalidated as well. If the application using the data structure so indicated, on step 374 one or more notifications may be sent to the application about the changed vertices.

When the application requires the contents of any of the invalidated vertices, the contents is optionally removed from the memory if it is present in memory at the time, and then fetched from an appropriate location, such as a database containing an updated version of the contents.

The method can be implemented for any data structure that comprises dependencies between objects. The dependency structure of the graph is separated from the actual contents, by creating a lean dependency layer which is separate from the data layer. Such separation enables efficient caching, in that the contents of a vertex can be eliminated from the memory (or a certain type of memory such as cache), without eliminating access to other vertices dependent on that vertex.

It will be appreciated that the description above relates also to a computer readable storage medium, such as a disk, a DVD, a disk on key or any other storage device containing a set of instructions for a general purpose computer, the set of instructions comprising the steps described above.

Figure 4:
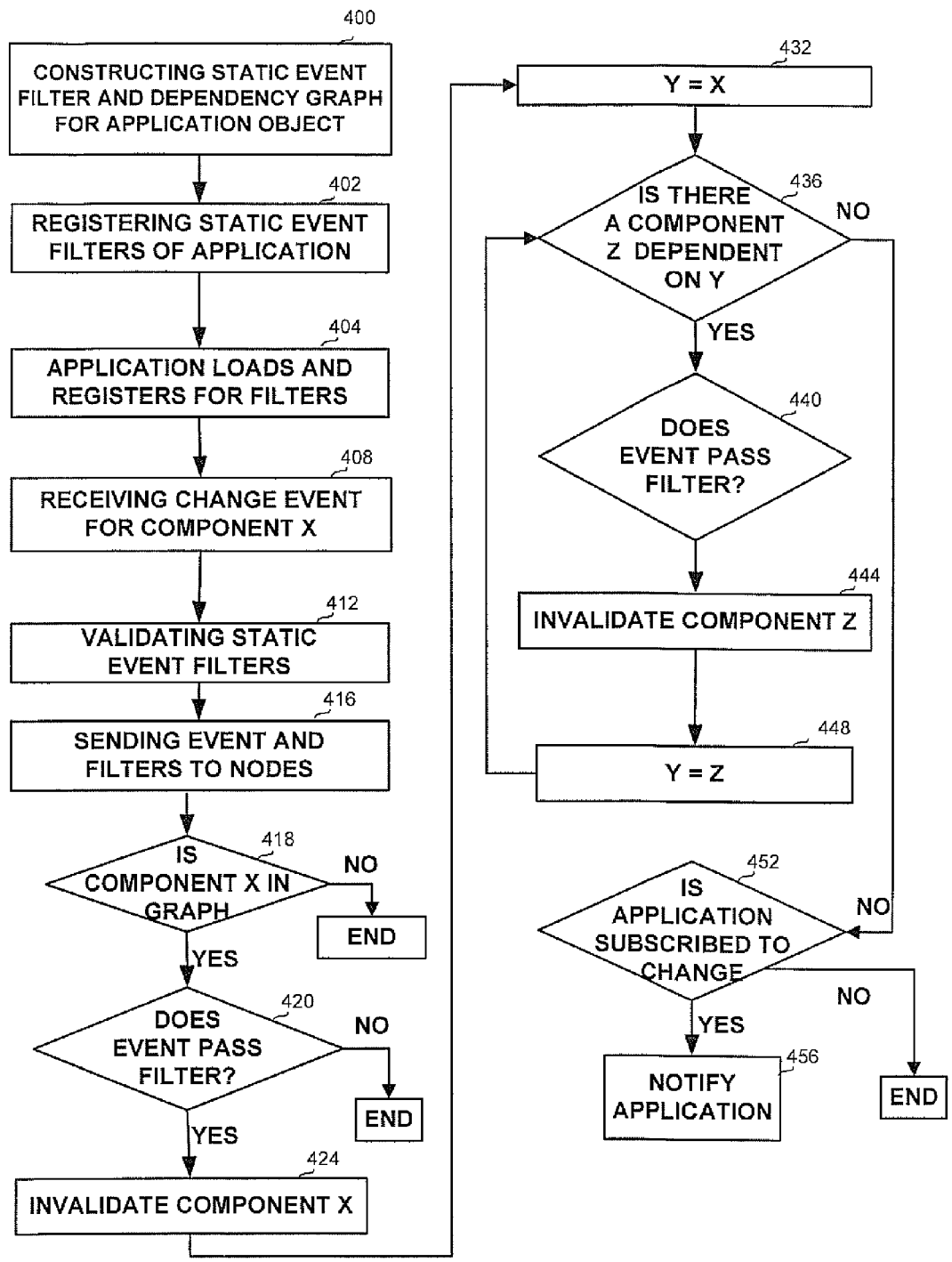
FIG. 4 is a flowchart of the main steps in a method for propagating events in a cluster, in accordance with the disclosure.

Referring now to FIG. 4, showing a flowchart of the main steps in a method in accordance with the disclosure.

On step 400, static event filters and component dependency graphs are constructed for each application within the system. Each static event filter indicates which changes to which attributes should be notified to the application. The filters can relate to all objects, or to objects of one or more particular types. For example, a navigation application may only be interested in changes to the names of the objects, since the application only presents the names and not related contents. The static events and attributes diffuse through the dependencies between objects, such that a dependency is created between object A and object B if object A requires object B, and if the information required by object B includes the attribute for which change notification is requested regarding object B.

If dependency between object A and object B already exists but does not include the required attribute, the attribute is added to the dependency.

On step 402 the static event filters are registered on each node of the cluster, for example by propagation of registration, such that when an application loads it can subscribe for the events.

On step 404, once an application is loaded, its dependency graph, such as the graphs shown in lean dependency layers 304 and 312 of FIG. 3, are constructed and kept in memory. The application also registers for any of the available filters. The application is loaded and executed in an ordinary manner, depending on the environment. The dependency graph may be recreated while loading or read from a repository such as the database.

On step 408, during run-time of the application on a particular node out of the cluster, an event is received, indicating a change to a component X.

On step 412 the event is validated by the node on which the event occurred, against all static filter events, and it is determined for which filters the event applies, i.e., which events relating to component X relate to the attribute that has actually been changed. If no event has passed, the process ends.

On step 416 the event, and the filters which the event has passed, are sent to all other nodes of the cluster.

The following steps occur on each node on the cluster, including the node on which the event occurred.

On step 418, it is determined whether component X is in the dependency graph of the specific node, i.e., does any of the application objects associated with the applications currently executed by the node, depend directly or indirectly on component X. If not, the process ends for the particular node.

If component X is in the graph, then it is determined on step 420 whether there exists registration for the event with any of the passed filters, i.e. did any of the currently executed applications register for this event. This step is required although the event was validated on the machine on which it occurred, since each application has its own memory management on each node, and the list of registered objects may differ between different nodes.

If such registration exists, then on step 424 component X is invalidated, i.e. marked in the dependency graph as invalid.

Step 432 is a preparatory step for traversing the sub-graph of all objects that depend on component X. On step 432 a loop variable Y, which is of type component, is assigned to be equal to X. Then on step 436 it is determined whether there is a component Z that depends on component Y. It will be appreciated that the dependency between component Z and component Y is related to the event, i.e. does the dependency have an attribute related to the change associated with the event.

On step 444 component Z is invalidated in the dependency graph, and on step 448 the loop returns to step 436 for component Z.

On step 452 it is determined whether one or more applications are subscribed to be notified about a change in any of the invalidated components. If there are any subscribed applications, on step 456 each of the subscribed applications is notified. The application or the application cache can then remove from memory all the invalidated components, and can determine whether to recreate the relevant application objects or not.

It will be appreciated that the loop comprising steps 436 to 448 is performed for all components depending directly or indirectly on component X. The dependency graph can be traversed using any graph traversing algorithm, such as BFS, DFS or others.

When the application determines that an application object is to be recreated, all required components that are marked as "invalid" or were removed from the cache memory, are fetched from the database and reloaded, so the application object recreation is performed using updated data.

Figure 5:
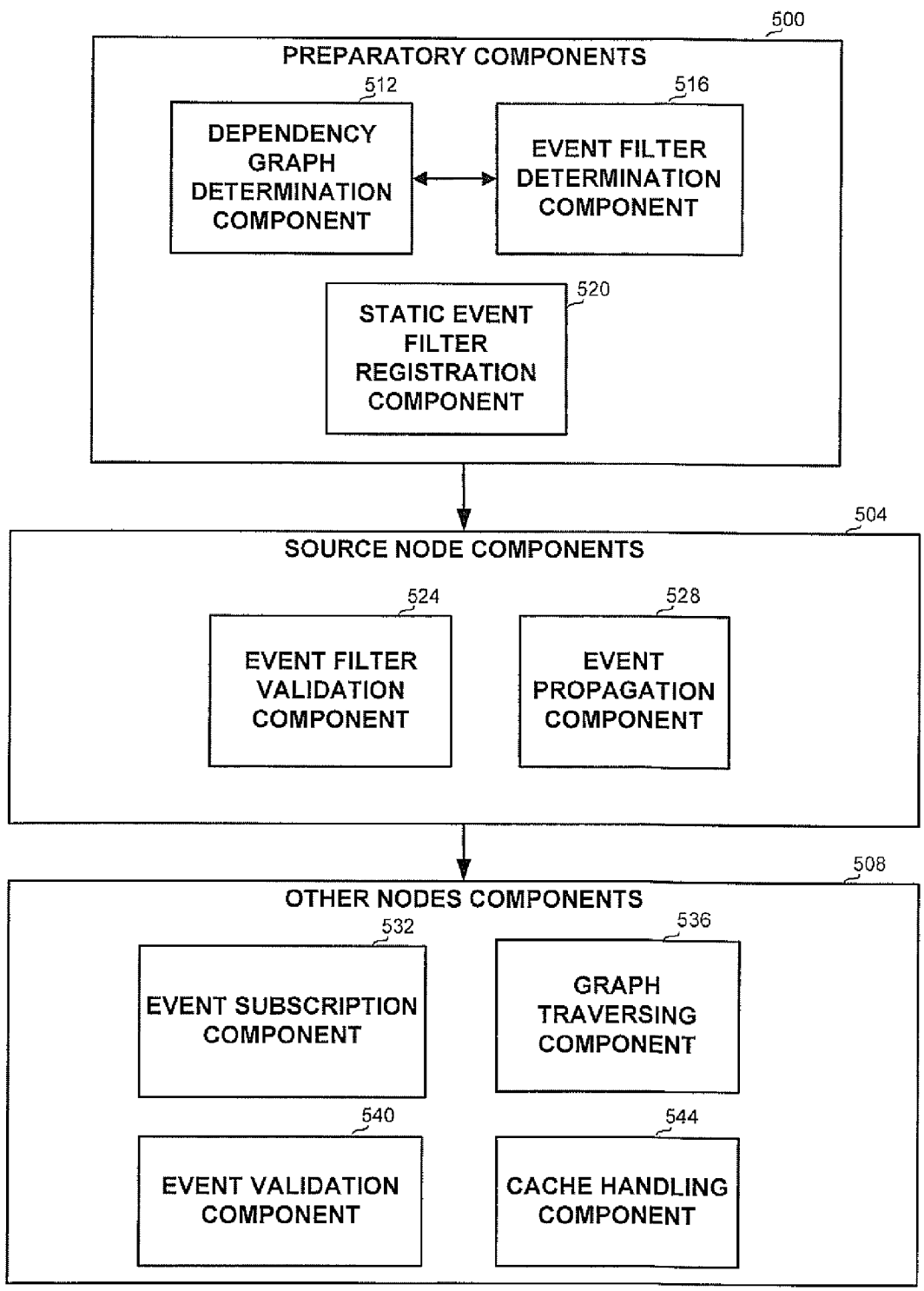
FIG. 5 is a block diagram of the main components in an apparatus in accordance with the disclosure.

Referring now to FIG. 5, showing a block diagram of the main components in an apparatus in accordance with the disclosure. The components include preparatory components 500, which are activated once, or when any of the applications in the environment changes; source machine components 504 which are activated by the machine on which a particular component, part, or data associated with an application changes; and other nodes components 508, which are activated on the other nodes in the cluster after a change occurred on one of the nodes.

It will be appreciated that in some embodiments, all components are installed on all nodes in the cluster, since the nodes are assumed to be symmetric, i.e. enable the same applications. The distinction between the components group is thus logical only and based on their activation timing.

Preparatory components 500 comprise dependency graph determination component 512, which determines the dependencies between components or data units required for the creation and operation of any application object. The dependencies may comprise the object pairs one of which depends on the other, as well as the attributes upon which one object depends on the other. Preparatory components 500 further comprise event filter determination component 516 which determines the filters for the events for which the applications requires notifications for. Yet another component of preparatory components 500 is static event registration component for registering the event filters within all nodes, so whichever node the application is executed by, it will be able to subscribe for the events.

Source node components 504 comprise event filter validation component 524 for filtering events occurring in the application. Each event is checked against all event filters registered by static event registration component 520 and indicates which filters pass the event. Source node components 504 further comprise event propagation component 528 for propagating events together with the filters they passed to all other nodes in the cluster.

Other nodes components 508 comprise the components that are executed on the other nodes, i.e. the nodes other than the node on which the event was originated. Other nodes components 508 comprise event subscription component 532 which enables an application to subscribe to particular events out of the events registered by static event registration component 520. Yet another component is graph traversing component 536 which enables the traversal of the dependency graph, in order to identify which components depend on a changed component in order to propagate an event within the dependency graph. Yet another component of other nodes components 508 is event validating component 540 that determines for a particular component whether a particular event has changed it, i.e., invalidated it.

Yet another component is application cache handling component 544 which receives notification from an application it is associated with regarding one or more invalid components, evacuates them from the cache and reloads from the central repository as necessary.

It will be appreciated that the components of FIG. 5 comprise one or more collections of interrelated computer instructions, such as web pages, units, executables, static libraries, dynamic libraries, or the like.

It will be appreciated that multiple implementations and variations of the method and apparatus can be designed. Various features and relative weights thereof can be considered and used. The method and apparatus can be implemented to assign sections to interactions, context units, words, or any other parts of an interaction.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for handling a data structure in a computerized system, the data structure comprising a first object having content and a second object having content, and interdependencies between the first object and the second object, the method comprising:
   receiving a description of the data structure;
   creating a graph structure indicating the interdependencies between the objects, the graph structure comprising at least a first vertex and a second vertex, the first vertex and the second vertex connected by an edge; and
   associating the first vertex with content of the first object and the second vertex with content of the second object, wherein the first vertex and the second vertex do not contain the content of the first object or the second object;
   wherein the computerized system comprises two nodes adapted to execute an application, and wherein the graph structure resides in a memory unit of each of the two nodes when one of the two nodes executes the application, the first object and the second object being components required for the application; and
   further comprising: constructing a dependency graph and an at least one event filter for the application; registering the at least one event filter with the application on each of the two nodes; registering the application to an at least one filter of the at least one event filters when the application is executed on a first node; receiving from the application a change event for an at least one component; validating whether the change event passes the at least one filter; consequent to said validation, sending the change event and the at least one filter to at least one second node; verifying whether the at least one component is being used by the at least one second node; consequent to said verification, indicating in association with the second vertex that an associated component should be reloaded; and consequent to said verification, indicating in association with the first vertex that the first component should be reloaded.

2. The method of claim 1 wherein the first vertex represents the first object, the second vertex represents the second object, and the edge represents dependency between the first object and the second object.

3. The method of claim 1 wherein the first edge is a directed edge.

4. The method of claim 1 further comprising the steps of: receiving a notification about a change in the contents of the at least one object associated with the first vertex; indicating in association with the first vertex that content of at least one of the first object or the second object should be reloaded; indicating in association with the second vertex that content of another of the first object or the second object should be reloaded.

5. The method of claim 4 further comprising a step of notifying an at least one application associated with the data structure about the change.

6. The method of claim 1 wherein the edge is associated with an attribute, such that the second object is dependent on the first object only if the change is associated with the attribute.

7. The method of claim 1 wherein the graph structure residing in the memory unit of each two nodes are identical.

8. The method of claim 1 further comprising a step of notifying the application executed on the at least one second node about the change.

9. An apparatus for handling a data structure in a computerized system comprising at least a first node and a second node, and an applications on each node, the data structure comprising two objects having content, and interdependencies between the two objects, the apparatus comprising:
   at least one preparatory component activated when at least one of the applications in the environment changes;
   at least one source machine component activated by the first node on which a particular component, part, or data associated with one of the applications changes; and
   at least one other nodes component activated on at least the second node after a change occurred on one of the nodes;
   wherein the at least one preparatory component comprises: a dependency graph determination component; an event filter determination component; and a static event filter registration component;
   wherein the dependency graph determination component creates a graph structure indicating the interdependencies between the two objects, the graph structure comprising at least a first vertex and a second vertex, the first vertex and the second vertex connected by an edge; and
   wherein the event filter determination component is registered with the applications on each of the two nodes; registering the applications to a filter of the event filters determination component when one of the applications is executed on a first node; receiving from the application a change event for a first object of the two objects; validating whether the change event passes the at least one filter; consequent to said validation, sending the change event and the at least one filter to at least one second node; verifying whether the first object of the two objects is being used by the at least one second node; consequent to said verification, indicating in association with the second vertex that an associated object should be reloaded; and consequent to said verification., indicating in association with the first vertex that the first object should be reloaded.

10. The apparatus of claim 9 wherein the at least one source machine component comprises: an event filter validation component; and an event propagation component.

11. The apparatus of claim 9 wherein the at least one other nodes component comprises: an event subscription component; a graph traversing component; an event validating component; and a cache handling component.

12. A computer readable storage medium containing a set of instructions for a general purpose computer, the set of instructions comprising:
   receiving a description of a data structure, the data structure comprising a first object having content and a second object having content, and interdependencies between the first object and the second object;
   creating a graph structure indicating the interdependencies between the first object and the second object, the graph structure comprising at least a first vertex and a second vertex, the first vertex and the second vertex connected by an edge; and
   associating the first vertex with content of the first object and the second vertex with content of the second object, wherein the first vertex and the second vertex do not contain the content of the first object or the second object;
   wherein the computerized system comprises two nodes adapted to execute an application, and wherein the graph structure resides in a memory unit of each of the two nodes when one of the two nodes executes the application, the first object and the second object being components required for the application; and
   further comprising: constructing a dependency graph and an at least one event filter for the application; registering the at least one event filter with the application on each of the two nodes; registering the application to an at least one filter of the at least one event filters when the application is executed on a first node; receiving from the application a change event for an at least one component; validating whether the change event passes the at least one filter; consequent to said validation, sending the change event and the at least one filter to at least one second node; verifying whether the at least one component is being used by the at least one second node; consequent to said verification, indicating in association with the second vertex that an associated component should be reloaded; and consequent to said verification, indicating in association with the first vertex that the first component should be reloaded.

* * * * *